D. BABCOCK.
Machine for Stretching and Drying Cloth.
No. 209,212. Patented Oct. 22, 1878.
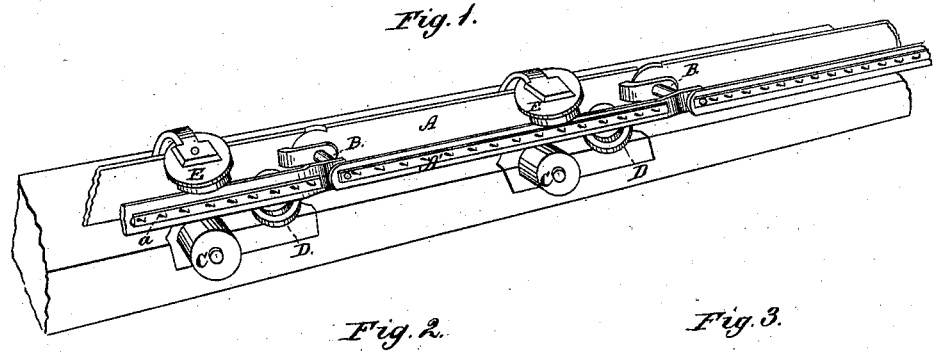
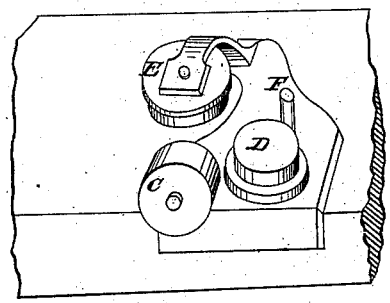
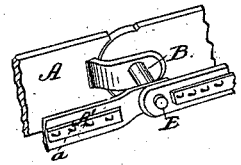
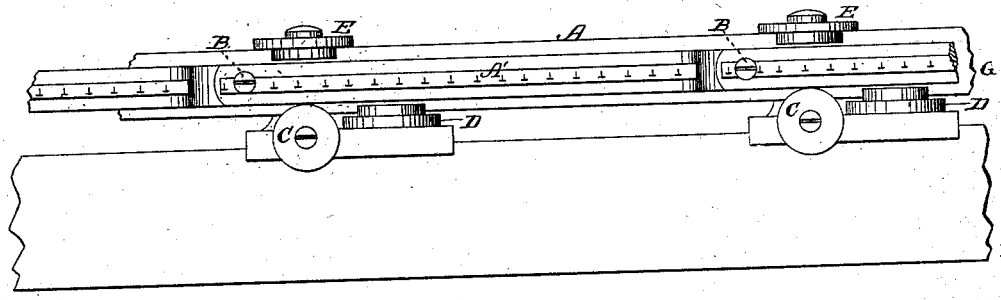
WITNESSES:
W. W. Hollingsworth
Edw. W. Byrn.
INVENTOR:
Darius Babcock
BY
ATTORNEYS.

UNITED STATES PATENT OFFICE.

DARIUS BABCOCK, OF OSWEGO, NEW YORK, ASSIGNOR OF ONE-HALF HIS RIGHT TO ALANSON S. PAGE, OF SAME PLACE.

IMPROVEMENT IN MACHINES FOR STRETCHING AND DRYING CLOTH.

Specification forming part of Letters Patent No. 209,212, dated October 22, 1878; application filed July 27, 1878.

*To all whom it may concern:*

Be it known that I, DARIUS BABCOCK, of Oswego city, county of Oswego, and State of New York, have invented a linked endless chain and stationary pulleys for its carriage, designed for the purpose of stretching and drying cloth, of which the following is a specification:

In my invention there is combined with the narrow jointed bar-link in common use a wider link, the lower edges of which narrow link resting on stationary pulleys, and the tendency to draw inward caused by the transverse strain placed on the chain while in use being guarded against, and the links guided in a proper vertical position by horizontal flanged pulleys, between the inner faces of which the upper and lower edges of the ordinary narrow link move, and on the adjoining sides or peripheries of which the wide links move, the joints of the links being offset, so as to leave the edges of the same with smooth and unbroken surfaces, against which the pulleys may revolve. I also, by locating one of the horizontal flanged pulleys, with its pivot, axis, or center, in advance of that of the other, relieve the joints of part of the strain by insuring that the solid part of the wide bar shall be in contact with one of the flanged pulleys while the joint is passing the other.

The front or narrow bar of the link receives the tenter-hooks, to which the cloth is attached, and the whole is carried forward by passing over twelve-sided drums, each side of which is equal to the length of a link.

The linked endless chain and pulleys are illustrated in detail in the perspective view, Figure 1, in which it has not been deemed necessary to show the driving mechanism. Fig. 2 is a perspective view of the flanged pulleys, the common pulley, and the guide-pin, set in a cast-iron frame and mounted on a wooden bed-piece. Fig. 3 is a perspective view of the joint between two links of the chain, and showing the manner of attaching the tenter-hooks. Fig. 4 is a side elevation of the chain shown in Fig. 1, drawn to the accompanying scale.

Similar letters of reference indicate corresponding parts.

Referring to the drawings, A A' are bars of wrought-iron or other metal, placed parallel to each other and connected on the center line of each at the joints by a shouldered rivet, B. The narrow bar, A', of the link rests on the pulleys C C, and the wide bar, A, of the link rests between and against the flanged pulleys D D and E E, and is confined in this position by the guide-pin F.

I claim as my invention—

1. The combination, with the endless jointed chain, consisting of the wide links or bars, A, and the narrow links or bars, A', provided with tenter-hooks $a$, the two being connected by the shouldered rivets B, and having the offset-joints constructed as described, of the flanged pulleys D E, the guide-pin F, and the pulleys C, as and for the purposes set forth.

2. The combination, with the toothed endless chain, consisting of the narrow bar or link, A', and the wide bar or link, A, the two connected by the shouldered rivets B, of the flanged guide-pulleys D E, the axis or center of one of which is in advance of that of the other, as and for the purpose set forth.

DARIUS BABCOCK.

Witnesses:
JOHN O. BARNES,
ARGALUS J. HOPKINS.